United States Patent
Osanishi

(10) Patent No.: US 11,634,602 B2
(45) Date of Patent: Apr. 25, 2023

(54) PRETREATMENT LIQUID FOR INKJET RECORDING, INKJET RECORDING APPARATUS, AND IMAGE FORMING METHOD

(71) Applicant: KYOCERA Document Solutions Inc., Osaka (JP)

(72) Inventor: Katsuki Osanishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 149 days.

(21) Appl. No.: 17/075,920

(22) Filed: Oct. 21, 2020

(65) Prior Publication Data

US 2021/0122935 A1 Apr. 29, 2021

(30) Foreign Application Priority Data

Oct. 23, 2019 (JP) .............................. JP2019-192649

(51) Int. Cl.
*C09D 11/38* (2014.01)
*C09D 11/101* (2014.01)
*C09D 11/322* (2014.01)
*B41J 2/21* (2006.01)

(52) U.S. Cl.
CPC .............. *C09D 11/38* (2013.01); *B41J 2/211* (2013.01); *C09D 11/101* (2013.01); *C09D 11/322* (2013.01)

(58) Field of Classification Search
CPC ... C07C 2601/14; C09D 11/03; C09D 11/102; C09D 11/322; C09D 11/38; C09D 11/40; C09D 11/54; C09D 11/101; D06P 5/30; B41J 11/0015; B41J 11/002; B41J 3/4078
See application file for complete search history.

(56) References Cited

U.S. PATENT DOCUMENTS

| 7,338,143 | B2 | 3/2008 | Onishi et al. |
| 8,957,212 | B2 * | 2/2015 | Kuramoto ............ C07D 233/60 546/195 |
| 2004/0090506 | A1 * | 5/2004 | Taguchi ............... B41M 5/5227 347/100 |
| 2005/0243121 | A1 | 11/2005 | Onishi |

(Continued)

FOREIGN PATENT DOCUMENTS

| JP | 2002-019263 A | 1/2002 |
| JP | 2003-055886 A | 2/2003 |
| WO | 2003-043825 A1 | 5/2003 |

*Primary Examiner* — John Zimmermann
(74) *Attorney, Agent, or Firm* — Studebaker & Brackett PC

(57) ABSTRACT

A pretreatment liquid for inkjet recording contains a photobase generator that produces an organic amine compound through light exposure. An inkjet recording apparatus forms an image on an image formation area of a recording medium. The inkjet recording apparatus includes a pretreatment section, a light exposure section, and a recording head. The pretreatment section ejects the pretreatment liquid for inkjet recording toward the image formation area of the recording medium. The light exposure section performs light exposure on the image formation area of the recording medium to which the pretreatment liquid for inkjet recording has been ejected. The recording head ejects an ink toward the image formation area of the recording medium subjected to the light exposure to form the image.

6 Claims, 1 Drawing Sheet

(56) References Cited

U.S. PATENT DOCUMENTS

| | | | |
|---|---|---|---|
| 2006/0262149 A1* | 11/2006 | Wood | C07D 211/46 347/1 |
| 2009/0298962 A1* | 12/2009 | Studer | C09D 7/63 524/92 |
| 2013/0278692 A1* | 10/2013 | Marino | B41J 3/543 347/102 |
| 2016/0312404 A1* | 10/2016 | Pan | D06P 1/5278 |
| 2019/0390078 A1* | 12/2019 | Moriyama | C08G 18/0814 |

* cited by examiner

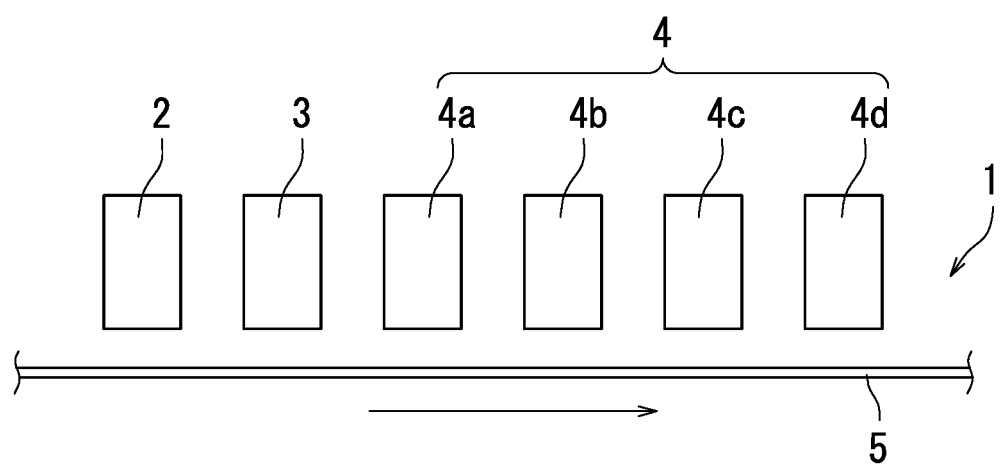

PRETREATMENT LIQUID FOR INKJET RECORDING, INKJET RECORDING APPARATUS, AND IMAGE FORMING METHOD

INCORPORATION BY REFERENCE

The present application claims priority under 35 U.S.C. § 119 to Japanese Patent Application No. 2019-192649, filed on Oct. 23, 2019. The contents of this application are incorporated herein by reference in their entirety.

BACKGROUND

The present disclosure relates to a pretreatment liquid for inkjet recording, an inkjet recording apparatus, and an image forming method.

There is a demand in inkjet recording apparatuses for forming, by line engine systems for commercial printing, images on coated paper for printing with quality equivalent to that of images formed by known offset printing. In such use, it is important to inhibit curling of and ink strike through in a recording medium while improving dot reproducibility. Moreover, in markets in drop-on-demand printing, point-of-purchase (POP) advertising, and sign graphics, a demand is sharply increasing for a technique of forming high-quality images by inkjet recording apparatuses using transparent films entirely coated with white paint as a type of recording medium. In such use, it is required to form high-quality images excellent in toughness on recording media that are poor in absorbency.

In order to cope with such demands, various methods are examined. Examples of the methods include a method in which a recording medium is pretreated in advance, a method in which a recording medium is heated directly after printing, a method using a quick drying ink, and a method using an ultraviolet curing ink. However, the number of processes increases in the method in which a recording medium is pretreated in advance, which tends to increase time and cost. Furthermore, ink nozzle clogging tends to readily occur in the method in which a recording medium is heated directly after printing and the method using a quick drying ink. Yet in the method using an ultraviolet curing ink, the ink may be cured before the ink after ejection is sufficiently flattened. For the reason as above, in the method using an ultraviolet curing ink, projections and recesses tend to be formed on the surface of a printed image and the thickness of a formed ink layer tends to increase.

In view of the foregoing, a method is studied in which a member that ejects a pretreatment liquid for inkjet recording is provided in an inkjet recording apparatus to eject the pretreatment liquid toward a recording medium directly before ink ejection. Examples of an effective component of the pretreatment liquid for inkjet recording include base components, cationic macromolecular compounds, acid components, and metal ions. Use of a pretreatment liquid for inkjet recording containing such an effective component causes an aggregation reaction between the effective component and a pigment in the ink on the surface of the recording medium. Through the above aggregation reaction, fixation of the pigment to the recording medium is prompted, thereby improving quality of formed images.

SUMMARY

A pretreatment liquid for inkjet recording according to an aspect of the present disclosure contains a photobase generator that produces an organic amine compound through light exposure.

An inkjet recording apparatus according to an aspect of the present disclosure forms an image on an image formation area of a recording medium, and includes a pretreatment section, a light exposure section, and a recording head. The pretreatment section ejects the aforementioned pretreatment liquid for inkjet recording toward the image formation area of the recording medium. The light exposure section performs light exposure on the image formation area of the recording medium to which the pretreatment liquid for inkjet recording has been ejected. The recording head forms the image by ejecting an ink toward the image formation area of the recording medium subjected to the light exposure.

An image forming method according to an aspect of the present disclosure is a method for forming an image on an image formation area of a recording medium, and includes: ejecting the aforementioned pretreatment liquid toward the image formation area of the recording medium; performing light exposure on the image formation area of the recording medium to which the pretreatment liquid has been ejected; and ejecting an ink toward the image formation area of the recording medium subjected to the light exposure to form the image.

BRIEF DESCRIPTION OF THE DRAWINGS

FIGURE is a side view of a main section of an example of an inkjet recording apparatus according to a second embodiment of the present disclosure.

DETAILED DESCRIPTION

The following describes embodiments of the present disclosure in detail. However, the present disclosure is no way limited to the following embodiments. The present disclosure can be reduced to practice with appropriate alterations within scope of purpose. Note that although description of part of which description is overlapped may be omitted as appropriate, the subject matter of the present disclosure is not limited. In the drawing, dimensional relationships such as length, width, thickness, and depth are changed as appropriate for the sake of clarity and simplification of the drawing, and do not express actual dimensional relationships. One of the following components may be used independently or two or more of the following components may be used in combination unless otherwise stated.

In the following description, the term "-based" may be appended to the name of a chemical compound in order to form a generic name encompassing both the chemical compound itself and derivatives thereof. Also, when the term "-based" is appended to the name of a chemical compound used in the name of a polymer, the term indicates that a repeating unit of the polymer originates from the chemical compound or a derivative thereof. Furthermore, the term "(meth)acryl" may be used as a generic term for both acryl and methacryl.

A halogen atom, an alkyl group having a carbon number of at least 1 and no greater than 6, an alkyl group having a carbon number of at least 1 and no greater than 5, a saturated alicyclic hydrocarbon ring, an unsaturated alicyclic hydrocarbon ring, an aromatic hydrocarbon ring, a heterocyclic ring, and an alkoxy group having a carbon number of at least 1 and no greater than 5 as used herein are each the following unless otherwise stated.

Examples of the halogen atom (halogen group) include a fluorine atom (fluoro group), a chlorine atom (chloro group), a bromine atom (bromo group), and an iodine atom (iodo group).

Examples of the alkyl group having a carbon number of at least 1 and no greater than 6 include a methyl group, an ethyl group, an n-propyl group, an isopropyl group, an n-butyl group, a sec-butyl group, a tert-butyl group, an n-pentyl group, an isopentyl group, a neopentyl group, a 1,2-dimethyl propyl group, and a straight chain or branched chain hexyl group. Examples of the alkyl group having a carbon number of at least 1 and no greater than 5 include alkyl groups having a carbon number of at least 1 and no greater than 5 out of the groups listed as examples of the alkyl group having a carbon number of at least 1 and no greater than 6.

Examples of the saturated alicyclic hydrocarbon ring include cycloalkane rings having a carbon number of at least 3 and no greater than 10 (specific examples include a cyclopentane ring, a cyclohexane ring, a cycloheptane ring, and a sycloctane ring).

Examples of the unsaturated alicyclic hydrocarbon ring include cycloalkane rings having a carbon number of at least 3 and no greater than 10 (specific examples include a cyclopentene ring and a cyclohexene ring) and cycloalkyne rings having a carbon number of at least 4 and no greater than 10 (specific examples include a cyclopentyne ring and a cyclohexyne ring).

The number of carbon atoms of the aromatic hydrocarbon ring may be at least 6 and no greater than 20, for example. Examples of the aromatic hydrocarbon ring include a benzene ring, a naphthalene ring, an anthracene ring, a phenanthrene ring, and a pyrene ring.

The heterocyclic ring has for example a carbon atom and a hetero atom (for example, at least one of a nitrogen atom, a sulfur atom, and an oxygen atom). The heterocyclic ring may have at least 3 and no greater than 20 ring members, for example. Specific examples of a heterocyclic ring having at least 3 and no greater than 20 ring members include a piperidine ring, a piperazine ring, a morpholine ring, a thiophene ring, a furan ring, a pyrrole ring, an imidazole ring, a pyrazole ring, an isothiazole ring, an isoxazole ring, an oxazole ring, a thiazole ring, a furazan ring, a pyran ring, a pyridine ring, a pyridazine ring, a pyrimidine ring, a pyrazine ring, an indole ring, a 1H-indazole ring, an isoindole ring, a chromene ring, a quinoline ring, an isoquinoline ring, a purine ring, a pteridine ring, a triazole ring, a tetrazole ring, a 4H-quinolizine ring, a naphthyridine ring, a benzofuran ring, a 1,3-benzodioxole ring, a benzoxazole ring, a benzothiazole ring, a benzimidazole ring, a carbazole ring, a phenanthridine ring, an acridine ring, a phenazine ring, and a phenanthroline ring.

The alkoxy group having a carbon number of at least 1 and no greater than 5 is an unsubstituted straight chain or branched chain alkoxy group. Examples of the alkoxy group having a carbon number of at least 1 and no greater than 5 include a methoxy group, an ethoxy group, an n-propoxy group, an isopropoxy group, an n-butoxy group, an isobutoxy group, a sec-butoxy group, a tert-butoxy group, and an n-pentyloxy group.

Values as measured for volume median diameter ($D_{50}$) of a powder (for example, a pigment particles) is a value measured using a laser diffraction particle size distribution analyzer ("ZETASIZER NANO ZS", product of Malvern Instruments Ltd.) unless otherwise stated.

First Embodiment: Pretreatment Liquid for Inkjet Recording

A pretreatment liquid for inkjet recording (also referred to below as a pretreatment liquid) according to a first embodiment of the present disclosure contains a photobase generator that produces an organic amine compound through light exposure (also referred to below as a specific photobase generator). Preferably, the pretreatment liquid of the present disclosure further contains water and a water-soluble organic solvent each as a solvent in addition to the specific photobase generator. The pretreatment liquid of the present disclosure may further contain a surfactant as an optional component. The pretreatment liquid of the present disclosure may further contain any other optional component as necessary.

The following describes an example of a method for using the pretreatment liquid of the present disclosure. First, in image formation using an inkjet recording apparatus, the pretreatment liquid of the present disclosure is ejected toward an image formation area of a recording medium directly before an image is formed by ejecting an ink toward the image formation area of the recording medium. Next, light exposure was performed on the image formation area of the recording medium to which the pretreatment liquid of the present disclosure has been ejected. Through light exposure, an organic amine compound is produced in the image formation area from the specific photobase generator contained in the pretreatment liquid of the present disclosure. Subsequently, the ink is ejected toward the image formation area of the recording medium to form an image. In image formation, an aggregation reaction between a pigment in the ink and the organic amine compound produced from the pretreatment liquid of the present disclosure is caused in the image formation area. This prompts fixation of the pigment to the recording medium, thereby achieving improvement in image quality of the image. Examples of the improvement in image quality include increase in image density and inhibition of occurrence of feathering (ink blurring) and color bleed. Note that color bleed is a phenomenon of degradation in image quality caused at a boundary part (inter-dot part) where inks (dots) different in color are adjacent to each other. In an image in which color bleed has occurred, a pigment of one of the inks is mixed with another ink in adjacent dots to make the image unclear.

Furthermore, use of the pretreatment liquid of the present disclosure can inhibit occurrence of ink nozzle clogging as compared to use of a known pretreatment liquid (for example, a pretreatment liquid containing a base component, a cationic macromolecule compound, an acid component, or a metal ion as an effective component). One of causes of the known pretreatment liquid causing ink nozzle clogging will now be described below. When the known pretreatment liquid and an ink are sequentially ejected in an inkjet recording apparatus, a portion of the ejected known pretreatment liquid and a portion of the ejected ink each disperse in the form of a mist in the inkjet recording apparatus. The mist of the dispersed known pretreatment liquid and the mist of the dispersed ink are mixed together in the inkjet recording apparatus to be a mist mixture. In the mist mixture, the effective component of the known pretreatment liquid agglomerates the pigment of the ink to produce agglomerate. A portion of the mist mixture including the thus produced agglomerate disperses in the inkjet recording apparatus and adheres to ink nozzles. In this manner, ink nozzle clogging occurs.

By contrast, the pretreatment liquid of the present disclosure contains the specific photobase generator. The specific photobase generator is not a component that causes an aggregation reaction between a pigment and itself. Therefore, even when the pretreatment liquid of the present disclosure in the form of mist is mixed with the mist of the ink, agglomerate is hardly produced in the generated mist mixture. As a result, the mist mixture of the mist of the pretreatment liquid of the present disclosure and the mist of the ink hardly causes ink nozzle clogging. As described above, as a result of the pretreatment liquid of the present disclosure containing the specific photobase generator, quality of formed images can be improved while occurrence of ink nozzle clogging can be inhibited. Furthermore, the organic amine compound is a base that is relatively readily volatized. Therefore, as a result of the pretreatment liquid of the present disclosure containing the specific photobase generator that produces an organic amine compound, a situation in which a base component remains on a recording medium after image formation can be prevented. Moreover, the specific photobase generator tends to be excellent in preservability as compared to any other photobase generators.

[Specific Photobase Generator]

The specific photobase generator produces an organic amine compound through light exposure. Preferable examples of the organic amine compound produced from the specific photobase generator through light exposure include compounds represented by chemical formulas (i) to (iv) shown below (also referred to below as organic amine compounds (i) to (iv), respectively). The organic amine compounds (i) to (iv) are excellent in volatility among organic amine compounds. Therefore, as a result of the pretreatment liquid of the present disclosure containing the specific photobase generator that produces any of the organic amine compounds (i) to (iv) through light exposure, a situation in which the organic amine compound remains on a recording medium after image formation can be further effectively prevented.

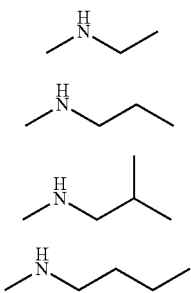

(i)

(ii)

(iii)

(iv)

The specific photobase generator is preferably a compound represented by general formula (1) shown below (also referred to below as a specific photobase generator (1)).

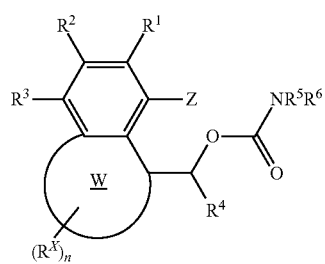

(1)

In general formula (1), Z represents a monovalent electron-withdrawing group. W represents a saturated alicyclic hydrocarbon ring, an unsaturated alicyclic hydrocarbon ring, or an aromatic hydrocarbon ring. $R^1$ to $R^3$ and $R^X$ each represent, independently of one another, a hydrogen atom, a monovalent hydrocarbon group having a carbon number of at least 1 and no greater than 5, or a hydrocarbon-oxy group having a carbon number of at least 1 and no greater than 5. n represents an integer of at least 0 and no greater than 5. Where n represents at least 2 and no greater than 5, chemical groups $R^X$ may be the same as or different from one another. Any of pairs of $R^1$ and $R^2$, $R^2$ and $R^3$, $R^3$ and one of the chemical groups $R^X$, and adjacent two of the chemical groups $R^X$ may be bonded to each other to form a ring. $R^4$ represents a hydrogen atom, a monovalent hydrocarbon group having a carbon number of at least 1 and no greater than 6, or a monovalent aromatic hydrocarbon group having a carbon number of at least 6 and no greater than 15. $R^5$ represents a monovalent hydrocarbon group having a carbon number of at least 1 and no greater than 15. $R^6$ represents a hydrogen atom or a monovalent hydrocarbon group having a carbon number of at least 1 and no greater than 15. $R^5$ and $R^6$ may be bonded to each other to form a ring.

Irradiation of the specific photobase generator (1) with light (active energy rays) readily causes a reaction represented by chemical equation (R) shown below. Specifically, light exposure causes photohydrogen transfer in the specific photobase generator (1), which makes the specific photobase generator (1) biradical. The biradical specific photobase generator (1) produces an organic amine compound ($HNR^5R^6$) through a decarboxylation reaction. Note that $R^1$ to $R^6$, $R^X$, Z, and n in chemical equation (R) are the same as those defined in general formula (1).

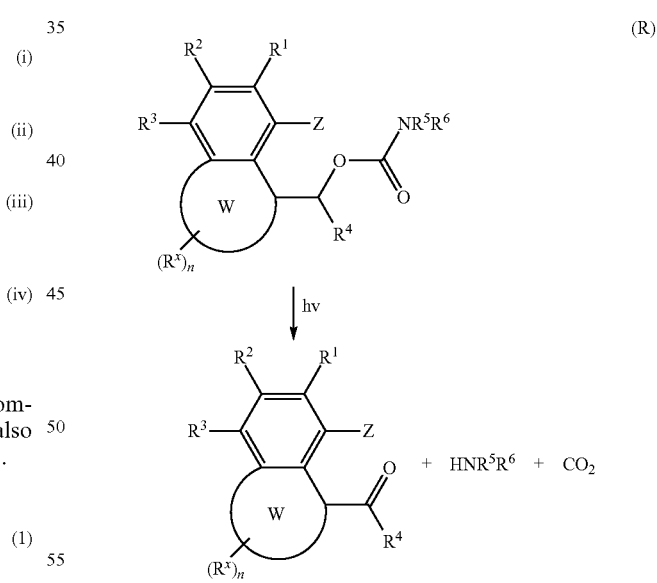

(R)

A monovalent electron-withdrawing group represented by Z in the specific photobase generator (1) serves as an active point of a hydrogen abstraction reaction caused by light exposure. The monovalent electron-withdrawing group represented by Z is very close to a hydrogen atom (hydrogen atom to be bonded to a carbon atom adjacent to $R^4$) that is to be withdrawn in the hydrogen abstraction reaction. Therefore, the specific photobase generator (1) tends to cause photohydrogen transfer through light exposure. From the above, the specific photobase generator (1) can efficiently produce an organic amine compound through light exposure, and therefore, is suitable as the specific photobase generator.

Examples of the monovalent electron-withdrawing group represented by Z in general formula (1) include a halogen group, alkyl groups having a carbon number of at least 1 and no greater than 5 and substituted with one or more halogen groups (for example, a trifluoromethyl group), a nitro group, and a cyano group. Preferably, Z represents a nitro group or a cyano group.

In general formula (1), W preferably represents an aromatic hydrocarbon ring, and more preferably represents a benzene ring.

An example of the monovalent hydrocarbon group having a carbon number of at least 1 and no greater than 5 that may be represented by any of $R^1$ to $R^3$ and $R^X$ in general formula (1) is an alkyl group having a carbon number of at least 1 and no greater than 5. Examples of the hydrocarbon-oxy group having a carbon number of at least 1 and no greater than 5 that may be represented by any of $R^1$ to $R^3$ and $R^X$ include alkoxy groups having a carbon number of at least 1 and no greater than 5 (specific examples include a methoxy group, an ethoxy group, and an isopropoxy group). Preferably, $R^1$ to $R^3$ each represent a hydrogen atom.

Preferably, n represents an integer of at least 0 and no greater than 3, and it is more preferable that n represents 0.

Examples of the ring formed as a result of any of pairs of $R^1$ and $R^2$, $R^2$ and $R^3$, $R^3$ and one of the chemical groups $R^X$, and adjacent two of the chemical groups $R^X$ being bonded to each other include a saturated alicyclic hydrocarbon ring, an unsaturated alicyclic hydrocarbon ring, an aromatic hydrocarbon ring, and a heterocyclic ring. Note that the "adjacent two of the chemical groups $R^X$" are as follows. Where there are adjacent two carbon atoms (a carbon atom at a position and a carbon atom at β position) and two respective chemical groups $R^X$ that are bonded to the carbon atom at a position and the carbon atom at β position, the two chemical groups $R^X$ are the "adjacent two of the chemical groups $R^X$".

An example of the monovalent hydrocarbon group having a carbon number of at least 1 and no greater than 6 that may be represented by $R^4$ in general formula (1) is an alkyl group having a carbon number of at least 1 and no greater than 6. Examples of the monovalent aromatic hydrocarbon group having a carbon number of at least 6 and no greater than 15 that may be represented by $R^4$ include a phenyl group, a benzyl group, a tolyl group, a xylyl group, a naphthyl group, and an anthracenyl group. Preferably, $R^4$ represents an alkyl group having a carbon number of at least 1 and no greater than 6, and it is more preferable that $R^4$ represents a methyl group.

Examples of the monovalent hydrocarbon group having a carbon number of at least 1 and no greater than 15 that is represented by $R^5$ and that may be represented by $R^6$ in general formula (1) include an alkyl group having a carbon number of at least 1 and no greater than 6 and a monovalent aromatic hydrocarbon group having a carbon number of at least 6 and no greater than 15. Preferably, $R^5$ represents an alkyl group having a carbon number of at least 1 and no greater than 6, and it is more preferable that $R^5$ represents an isobutyl group or an n-butyl group. Preferably, $R^6$ represents a hydrogen atom.

The specific photobase generator (1) preferably includes a compound represented by chemical formula (1-1) shown below (also referred to below as a specific photobase generator (1-1)).

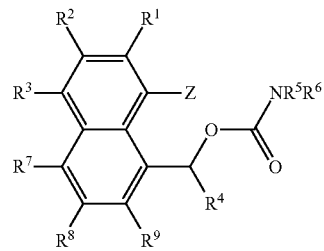

(1-1)

In general formula (1-1), Z and $R^4$ to $R^6$ are the same as those defined in general formula (1). $R^1$ to $R^3$ and $R^7$ to $R^9$ each represent, independently of one another, a hydrogen atom, a monovalent hydrocarbon group having a carbon number of at least 1 and no greater than 5, or a hydrocarbon-oxy group having a carbon number of at least 1 and no greater than 5. Any of pairs of $R^1$ and $R^2$, $R^2$ and $R^3$, $R^3$ and $R^7$, $R^7$ and $R^8$, and $R^8$ and $R^9$ may be bonded to each other to form a ring.

Examples of the monovalent hydrocarbon group having a carbon number of at least 1 and no greater than 5 that may be represented by any of $R^7$ to $R^9$ in general formula (1-1) include an alkyl group having a carbon number of at least 1 and no greater than 5. Examples of a hydrocarbon-oxy group having a carbon number of at least 1 and no greater than 5 that may be represented by any of $R^7$ to $R^9$ include alkoxy groups having a carbon number of at least 1 and no greater than 5 (specific examples include a methoxy group, an ethoxy group, and an isopropoxy group). Preferably, $R^7$ to $R^9$ each represent a hydrogen atom.

Examples of the ring formed as a result of any of pairs of $R^1$ and $R^2$, $R^2$ and $R^3$, $R^3$ and $R^7$, $R^7$ and $R^8$, and $R^8$ and $R^9$ being boned to each other in general formula (1-1) include a saturated alicyclic hydrocarbon ring, an unsaturated alicyclic hydrocarbon ring, an aromatic hydrocarbon ring, and a heterocyclic ring.

The specific photobase generator (1-1) preferably includes any of compounds represented by chemical formulas (I) to (IV) shown below (also referred to below as specific photobase generators (I) to (IV), respectively).

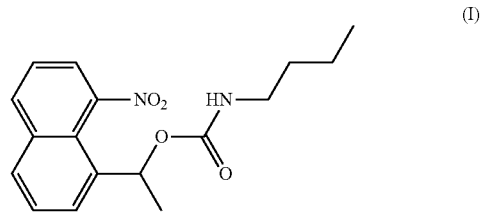

(I)

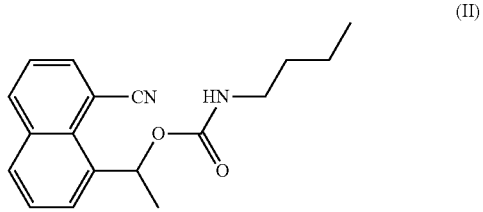

(II)

-continued

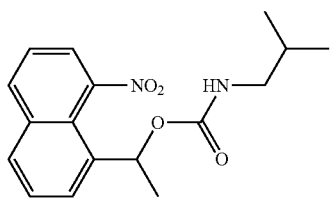
(III)

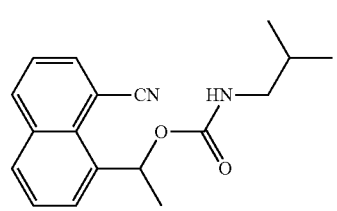
(IV)

(Synthesis Method of Specific Photobase Generator (1))

The specific photobase generator (1) can be synthesized for example by sequentially inducing reactions represented by chemical equations (R-1) to (R-4) shown below (also referred to below as first to fourth reactions, respectively) using a compound represented by general formula (A) shown below (also referred to below as a raw material compound (A)) as a raw material. Note that Z, $R^1$ to $R^6$, $R^X$, W, and n in general formula (A) and chemical equations (R-1) to (R-4) are the same as those defined in general formula (1).

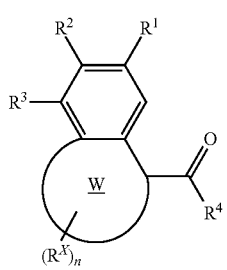
(A)

(First Reaction)

The first reaction is represented by chemical equation (R-1). Specifically, an electron-withdrawing group is provided to the raw material compound (A) in the first reaction. This yields a compound represented by general formula (B) shown below (also referred to below as an intermediate (B)). An example of a method for providing an electron-withdrawing group to the raw material compound (A) is a nitration method using concentrated nitric acid. Another example of the method for providing an electron-withdrawing group to the raw material compound (A) is a method in which the raw material compound (A) is nitrated and then a nitro group of the nitrated raw material compound (A) is converted to another electron-withdrawing group (for example, a cyano group). For example, the nitro group of the nitrated raw material compound (A) is converted to an amino group by reducing the nitrated raw material compound (A) with hydrogen gas. Through the above, a raw material compound (A) substituted with an amino group is yielded. Subsequently, the raw material compound (A) substituted with an amino group is treated with $NaNO_2$ and CuCN to convert the amino group of the raw material compound (A) substituted with the amino group to a cyano group. Through the above processes, an intermediate (B) having a cyano group represented by Z in general formula (B) shown below is yielded. The yielded intermediate (B) may be purified as necessary.

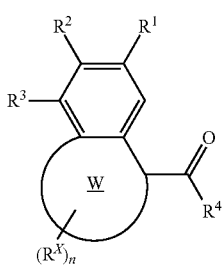
(A)

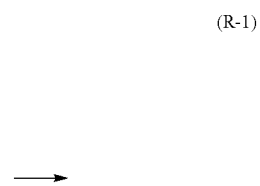

(R-1)

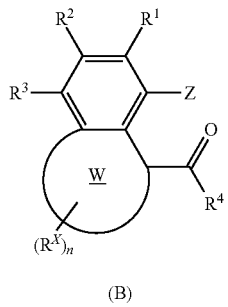
(B)

(Second Reaction)

The second reaction is represented by chemical equation (R-2) shown below. Specifically, the intermediate (B) is reduced using a reductant (for example, sodium borohydride) in the second reaction. This yields a compound represented by general formula (C) shown below (also referred to below as an intermediate (C)). The yielded intermediate (C) may be purified as necessary.

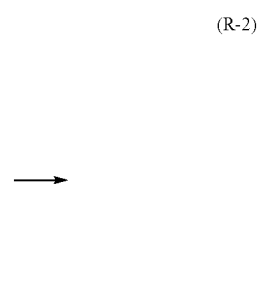
(B)

(R-2)

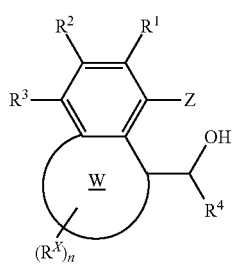
(C)

(Third Reaction)

The third reaction is represented by chemical equation (R-3) shown below. Specifically, the intermediate (C) is made carbamic using 1,1'-carbonyldiimidazole (CDI) in the third reaction. This produces a compound represented by general formula (D) shown below (also referred to below as an intermediate (D)). The third reaction is preferably carried out in presence of a base (for example, trimethylamine).

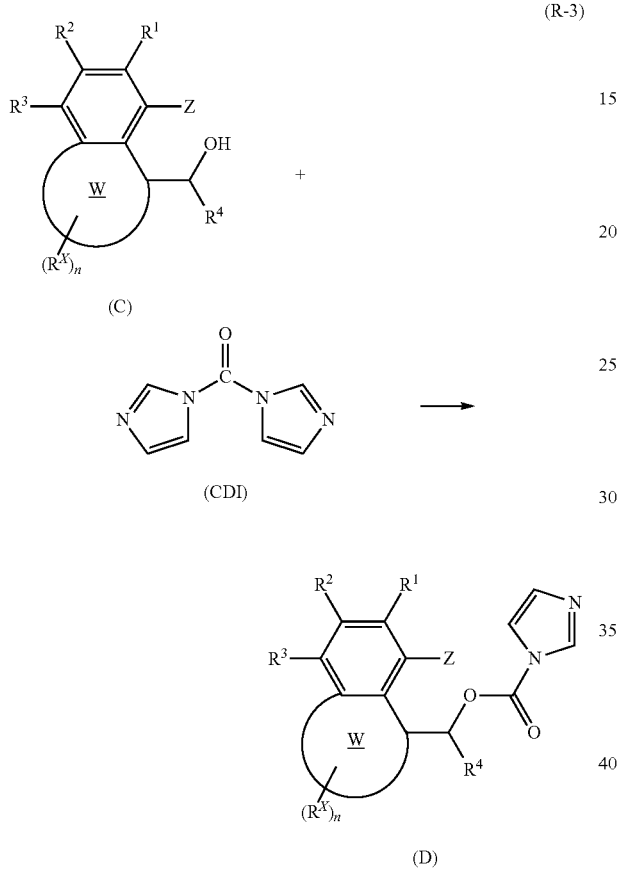

(Fourth Reaction)

The fourth reaction is represented by chemical equation (R-4) shown below. Specifically, the intermediate (D) is caused to react with an organic amine compound ($HNR^5R^6$) in the fourth reaction. This yields the specific photobase generator (1). The resultant specific photobase generator (1) may be purified as necessary.

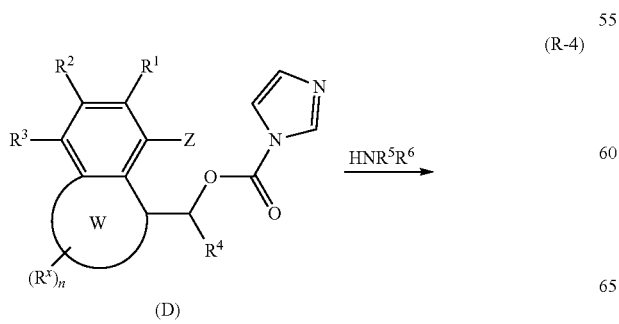

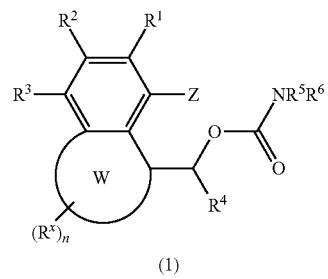

Examples of a specific photobase generator other than the specific photobase generator (1) include compounds represented by formulas (2) to (8) shown below.

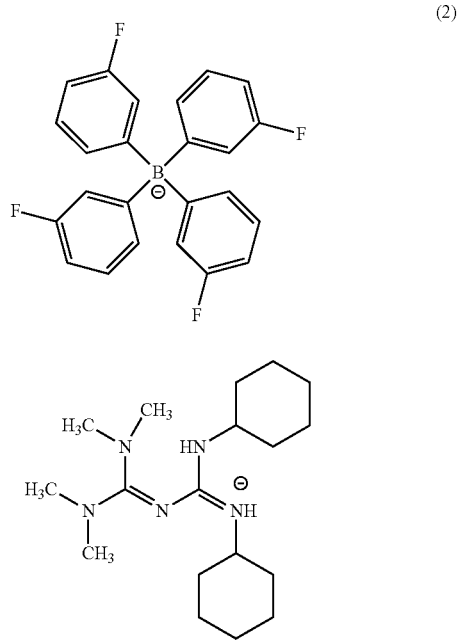

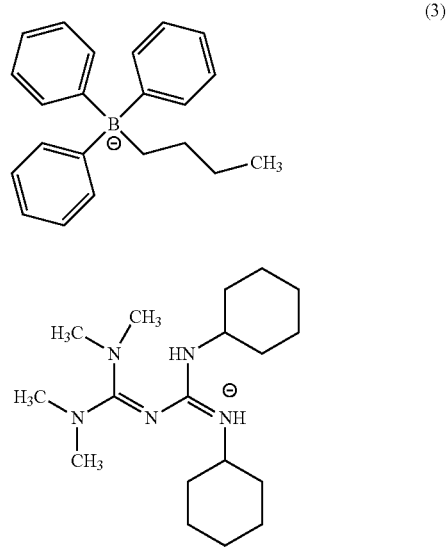

(4)

(5)

(6)

(7)

(8)

A content by percentage of the specific photobase generator in the pretreatment liquid of the present disclosure is preferably at least 0.1% by mass and no greater than 5.0% by mass, and more preferably at least 0.2% by mass and no greater than 2.0% by mass.

[Water]

Water serves as a main solvent of the pretreatment liquid of the present disclosure. As a result of the pretreatment liquid of the present disclosure containing water as a main solvent, an environmental load can be reduced. Where the pretreatment liquid of the present disclosure contains water, a content by percentage of the water is preferably at least 60.0% by mass and no greater than 95.0% by mass, and more preferably at least 80.0% by mass and no greater than 90.0% by mass.

[Water-Soluble Organic Solvent]

The water-soluble organic solvent increases solubility of the specific photobase generator in the pretreatment liquid of the present disclosure. Furthermore, the water-soluble organic solvent inhibits volatilization of a liquid component, thereby stabilizing viscosity of the pretreatment liquid of the present disclosure. Examples of the water-soluble organic solvent include glycol compounds, glycerin, ether compounds of polyhydric alcohols, acetate compounds, thiodiglycol, nitrogen-containing compounds, and dimethyl sulfoxide.

Examples of the glycol compounds include ethylene glycol, propylene glycol, diethylene glycol, triethylene glycol, and tetraethylene glycol.

Examples of the ether compounds of polyhydric alcohols include diethylene glycol diethyl ether, diethylene glycol monobutyl ether, ethylene glycol monomethyl ether, ethylene glycol monobutyl ether, methyl carbitol, ethyl carbitol, butyl carbitol, ethyl carbitol acetate, diethyl carbitol, triethylene glycol monomethyl ether, triethylene glycol monoethyl ether, and propylene glycol monomethyl ether.

Examples of the nitrogen-containing compounds include lactam compounds (for example, 2-pyrrolidone and N-methyl-2-pyrrolidone), 1,3-dimethylimidazolidinone, formamide, and dimethyl formamide.

The pretreatment liquid of the present disclosure preferably contains at least one of glycerin or a lactam compound as the water-soluble organic solvent, more preferably contains glycerin and a lactam compound, and further preferably contains glycerin and 2-pyrrolidone.

Where the pretreatment liquid of the present disclosure contains a water-soluble organic solvent, a content by percentage of the water-soluble organic solvent is preferably at least 2.0% by mass and no greater than 40.0% by mass, and more preferably at least 7.0% by mass and no greater than 25.0% by mass.

Where the pretreatment liquid of the present disclosure contains glycerin, a content by percentage of the glycerin is preferably at least 1.0% by mass and no greater than 25.0% by mass, and more preferably at least 5.0% by mass and no greater than 15.0% by mass.

Where the pretreatment liquid of the present disclosure contains a lactam compound, a content by percentage of the lactam compound is preferably at least 1.0% by mass and no greater than 15.0% by mass, and more preferably at least 2.0% by mass and no greater than 10.0% by mass.

Preferably, the pretreatment liquid of the present disclosure only contains water, glycerin, and a lactam compound as solvents. A total content ratio of the water, the glycerin, and the lactam compound in the solvent in the present treatment liquid of the present disclosure is preferably at least 90.0% by mass, and more preferably at least 99.0% by mass.

[Surfactant]

A surfactant increases wettability of the pretreatment liquid of the present disclosure to a recording medium. The surfactant is preferably a nonionic surfactant, and more preferably an acetylene glycol surfactant (for example, "OLFINE (registered Japanese trademark) E1010", product of Nissin Chemical Industry Co., Ltd., which is ethylene oxide adduct of acetylene diol).

Where the pretreatment liquid of the present disclosure contains a surfactant, a content by percentage of the surfactant is preferably at least 0.01% by mass and no greater than 2.00% by mass, and more preferably at least 0.05% by mass and no greater than 0.50% by mass.

[Pretreatment Liquid Preparation Method]

The pretreatment liquid of the present disclosure can be prepared by adding the specific photobase generator and an optional component to be added as necessary, such as a surfactant, to a solvent.

Second Embodiment: Inkjet Recording Apparatus

An inkjet recording apparatus according to a second embodiment of the present disclosure is an inkjet recording apparatus that forms an image on an image formation area of a recording medium and that includes a pretreatment section, a light exposure section, and a recording head. The pretreatment section ejects the pretreatment liquid according to the present disclosure toward the image formation area of the recording medium. The light exposure section performs light exposure on the image formation area of the recording medium to which the pretreatment liquid has been ejected. The recording head forms an image by ejecting an ink toward the image formation area of the recording medium subjected to the light exposure. When the pretreatment liquid according to the first embodiment is used in the inkjet recording apparatus of the present disclosure, quality of formed images can be improved while occurrence of ink nozzle clogging can be inhibited.

The following describes an example of the inkjet recording apparatus of the present disclosure with reference to FIGURE. FIGURE is a side view of a main section of the inkjet recording apparatus 1 which is an example of the inkjet recording apparatus of the present disclosure. The inkjet recording apparatus 1 includes at least a pretreatment section 2, a light exposure section 3, a first recording head 4a, a second recording head 4b, a third recording head 4c, a fourth recording head 4d, and a conveyor belt 5. The pretreatment section 2 ejects a pretreatment liquid toward an image formation area of a recording medium (not illustrated). The light exposure section 3 performs light exposure on the image formation area of the recording medium to which the pretreatment liquid has been ejected. The first recording head 4a, the second recording head 4b, the third recording head 4c, and the fourth recording head 4d (also referred to below collectively as recording heads 4) each form an image by ejecting an ink toward the image formation area of the recording medium subjected to the light exposure. The conveyor belt 5 conveys the recording medium. The first to fourth recording heads 4a to 4d eject different color inks (for example, a yellow ink, a magenta ink, a cyan ink, and a black ink, respectively). The inkjet recording apparatus 1 forms a full-color image on the recording medium for example based on image data and print conditions (specific examples include duplex printing and simplex printing) received from an external computer.

The conveyor belt 5 is for example an endless belt and conveys the recording medium in one direction (rightward in FIGURE). The pretreatment section 2, the light exposure section 3, and the first to fourth recording heads 4a to 4d are arranged above the conveyor belt 5 in the stated order in terms of a conveyance direction of the recording medium. While conveying the recording medium using the conveyor belt 5, the inkjet recording apparatus 1 performs ejection of the pretreatment liquid toward, light exposure on, and ejection of the inks toward the image formation area of the recording medium when the image formation area is conveyed to locations directly below the pretreatment section 2, the light exposure section 3, and the first to fourth recording heads 4a to 4d, respectively. The inkjet recording apparatus 1 has been described so far with reference to FIGURE.

However, the inkjet recording apparatus 1 illustrated in FIGURE is only an example of the inkjet recording apparatus of the present disclosure. Specifically, the number of the recording heads included in the inkjet recording apparatus of the present disclosure may be only one (that is, the inkjet recording apparatus of the present disclosure may be for monochrome image formation), two, three, or five or more. Furthermore, the inkjet recording apparatus of the present disclosure may include no conveyor belt. In the above configuration, the inkjet recording apparatus of the present disclosure may include a movable pretreatment section, a movable light exposure section, and a movable recording head. That is, the inkjet recording apparatus of the present disclosure may perform pretreatment, light exposure, and ink ejection on the image formation area of the recording medium through sequential movement of the pretreatment section, the light exposure section, and the recording head(s) to a location above the image formation area instead of through conveyance of the recording medium. Moreover, the inkjet recording apparatus of the present disclosure may further include an additional member besides the pretreatment section, the light exposure section, the recording head(s), and the conveyor belt. Examples of the additional member that may be included in the inkjet recording apparatus of the present disclosure include a supply section that supplies the recording medium to the conveyor belt, a post-treatment section that performs post-treatment (for example, drying treatment) on the recording medium with an image formed thereon, a cleaner that cleans the recording head(s) after ink ejection, an electronic controller (for example, a central processing unit (CPU) and memory), an input and output section (for example, a keyboard, a mouse, or a touch panel), and a communication section. The following describes in detail the recording medium, the pretreatment section, the light exposure section, and the recording heads.

[Recording Medium]

No particular limitations are placed on material, shape, and thickness of the recording medium as long as the recording medium is a sheet-shaped member. Examples of the recording medium include printing paper (for example, coated paper and gravure printing paper), fabric (for example, polyester cloth), and resin films (for example, a polyester film). The inkjet recording apparatus of the present disclosure performs pretreatment using the pretreatment liquid according to the first embodiment, and therefore, can form high-quality images on recording media having low water-absorption, such as a resin film and coated paper, and even textiles having high water repellency, such as polyester textile.

[Pretreatment Section]

The pretreatment section ejects a pretreatment liquid toward an image formation area of a recording medium. No particular limitations are placed on a method for ejecting the pretreatment liquid, and examples of the method include a piezoelectric jetting, thermal jetting, and spray jetting.

The ejection amount of the pretreatment liquid can be changed as appropriate according to the type of recording medium, and may be set to at least 1 nL and no greater than 10 nL relative to 1 $mm^2$ of the image formation area of the recording medium.

[Light Exposure Section]

The light exposure section performs light exposure on the image formation area of the recording medium to which the pretreatment liquid has been ejected. Light exposure produces a base component (organic amine compound) from the specific photobase generator contained in the pretreatment liquid in the image formation area of the recording medium. Exposure light including light having a wavelength of for example shorter than 400 nm can be used as exposure light for light exposure. The wavelength of the exposure light is preferably 150 nm or longer and 300 nm or shorter, and more preferably 200 nm or longer and 250 nm or shorter.

Examples of the exposure light include resonance lines (313 nm and 254 nm) of a high-pressure mercury lamp, KrF excimer laser light (248 nm), KrCl excimer laser light (222 nm), and ArF excimer laser light (193 nm). An exposure dose of the exposure light may be set to for example at least 1 mJ/cm$^2$ and no greater than 100 mJ/cm$^2$.

[Recording Heads]

The recording heads each form an image by ejecting an ink toward the image formation area of the recording medium subjected to light exposure. A pigment in each ejected ink causes an aggregation reaction with a base component in the image formation area. This prompts fixation of the pigments in the inks to the image formation area, thereby forming a high-quality image. No particular limitations are placed on the recording heads, and any recording head included in a typical inkjet recording apparatus (for example, a line type recording head or a serial type recording head) can be used.

(Inks)

Any ink used in typical inkjet recording apparatuses (for example, a water-based ink) can be used as each ink to be ejected from a corresponding recording head. The water-based ink contains for example an aqueous medium and pigment particles. The pigment particles are present in a state dispersed in the aqueous medium. The water-based ink containing pigment particles may further contain either or both a surfactant and a water-soluble organic solvent.

(Pigment Particles)

The pigment particles may each be a particle constituted only by a pigment or a particle containing a pigment and a coating resin coating at least part of a surface of the pigment. Preferably, the pigment particles contain a pigment and a cationic resin as a coating resin. A pigment in a water-based ink containing pigment particles containing a cationic resin readily agglomerates through a reaction with an organic amine compound. For the above reason, such a water-based ink is suitable as an ink for use in the inkjet recording apparatus of the present disclosure.

The pigment particles have a volume median diameter ($D_{50}$) of preferably at least 30 nm and no greater than 200 nm in view of color density, hue, and stability of the water-based ink, and more preferably at least 70 nm and no greater than 130 nm.

(Pigment)

Examples of the pigment include yellow pigments, orange pigments, red pigments, blue pigments, violet pigments, and black pigments. Examples of the yellow pigments include C. I. Pigment Yellow 74, 93, 95, 109, 110, 120, 128, 138, 139, 151, 154, 155, 173, 180, 185, or 193. Examples of the orange pigments include C. I. Pigment Orange 34, 36, 43, 61, 63, or 71. Examples of the red pigments include C. I. Pigment Red 122 or 202. Examples of the blue pigments include C. I. Pigment Blue 15 or 15:3. Examples of the violet pigments include C. I. Pigment Violet 19, 23, or 33. Examples of the black pigments include C. I. Pigment Black 7.

Where the water-based ink contains a pigment, a content by percentage of the pigment is preferably at least 4% by mass and no greater than 8% by mass. As a result of the content by percentage of the pigment being set to at least 4% by mass, formation of an image with a desired image density can be facilitated. By contrast, as a result of the content by percentage of the pigment being set to no greater than 8% by mass, penetrability of the water-based ink to a recording medium can be easily ensured. Furthermore, as a result of the content by percentage of the pigment being set to no greater than 8% by mass, fluidity of the pigment in the water-based ink can be easily ensured with a result that formation of an image with a desired image density can be facilitated.

(Coating Resin)

As described above, a cationic resin is preferable as the coating resin. An examples of the cationic resin is a resin including a repeating unit having a piperidinium structure.

(Surfactant)

A surfactant increases wettability of the water-based ink to a recording medium. A type and a content of the surfactant in the water-based ink can be respectively set to the type and the content of the surfactant exemplified in description of the pretreatment liquid.

(Water-Soluble Organic Solvent)

The water-soluble organic solvent inhibits volatilization of a liquid component, thereby stabilizing viscosity of the water-based ink. A type and a content of the water-soluble organic solvent in the water-based ink can be respectively set to the type and the content of the water-soluble organic solvent exemplified in the description of the pretreatment liquid.

Preferably, the type and the content of a water-soluble organic solvent contained in the pretreatment liquid are the same as those of a water-soluble organic solvent contained in the water-based ink. It is also preferable that the type and the content of a surfactant contained in the pretreatment liquid are the same as those of a surfactant contained in the water-based ink. By approximating the composition of the pretreatment liquid to that of the water-based ink as above, the pretreatment liquid and the water-based ink each ejected on the recording medium are readily mixed with each other, thereby prompting an aggregation reaction between the pigment in the water-based ink and the base component produced from the specific photobase generator in the pretreatment liquid.

Third Embodiment: Image Forming Method

An image forming method according to a third embodiment of the present disclosure is a method for forming an image on an image formation area of a recording medium, and includes the steps of: ejecting the pretreatment liquid according to the first embodiment toward the image formation area of the recording medium; performing light exposure on the image formation area of the recording medium to which the pretreatment liquid has been ejected; and ejecting an ink toward the image formation area of the recording medium subjected to the light exposure to form an image. When the pretreatment liquid according to the first embodiment is used in the image forming method of the present disclosure, quality of formed images can be improved while occurrence of ink nozzle clogging can be inhibited.

The image forming method of the present disclosure can be implemented for example by the inkjet recording apparatus according to the second embodiment. The recording medium and the ink in the image forming method of the present disclosure can be the same as the recording medium and the ink used in the inkjet recording apparatus according to the second embodiment. The following describes each step.

[Ejecting Pretreatment Liquid]

In the ejecting the pretreatment liquid, the pretreatment liquid according to the first embodiment is ejected toward the image formation area of the recording medium. No particular limitations are placed on a pretreatment liquid ejection method, and an example of the method is a method for ejecting a pretreatment liquid using the pretreatment section described in association with the second embodiment.

[Performing Light Exposure]

In the performing light exposure, light exposure is performed on the image formation area of the recording medium to which the pretreatment liquid has been ejected. The above light exposure produces a base component from the specific photobase generator contained in the pretreatment liquid. No particular limitations are placed on a light exposure method, and an example of the method is light exposure on an image formation area of a recording medium using the light exposure section described in association with the second embodiment.

[Ejecting Ink]

In the ejecting ink, an ink is ejected toward the image formation area of the recording medium subjected to the light exposure to form an image. No particular limitations are placed on an ink ejection method, and an example of the method is a method for ejecting an ink using the recording heads described in association with the second embodiment.

The image forming method of the present disclosure may further include an additional step besides the ejecting the pretreatment liquid, the performing light exposure, and the ejecting an ink. Examples of the additional step include performing post-treatment (specific examples include drying treatment) on the recording medium with the image formed thereon and performing cleaning on the recording heads after the ejecting an ink.

Examples

The following describes the present disclosure further specifically using examples. However, the present disclosure is not limited to the scope of the examples.

[Preparation of Specific Photobase Generators]

The photobase generators (I) to (IIV) described in association with the first embodiment were synthesized according to the following methods.

(Specific Photobase Generator (I))

A compound (acetonaphthone) represented by chemical formula (a-1) shown below was used as a raw material compound. Reactions (first to fourth reactions) represented by chemical equations (r-1) to (r-4) shown below were carried out with the raw material compound to synthesize the specific photobase generator (I).

(First Reaction)

A four-necked flask with a thermometer and a stir bar set thereto was used as a reaction vessel. The reaction vessel was charged with 50 mL of concentrated nitric acid, and the vessel contents was stirred. Next, the vessel content was cooled using an ice water bath to decrease the internal temperature of the reaction vessel to around 0° C. The reaction vessel was then charged gradually with 10 g of acetonaphthone. Through the above gradual charging, the acetonaphthone was completely dissolved in the concentrated nitric acid. Next, the vessel contents were stirred for approximately one hour while the internal temperature of the reaction vessel was kept at around 0° C. using the ice water bath. Thereafter, the internal temperature of the reaction vessel was increased to around 20° C., and then, the vessel contents were further stirred for approximately one hour (nitration reaction). After the stirring, thin layer chromatography was performed to confirm that the nitration reaction of the contents of the reaction vessel has been completed. In the thin layer chromatography, a solvent mixture of ethyl acetate and n-hexane (mass of ethyl acetate:mass of n-hexane=1:3) was used as a developing solvent. Next, 650 mL of ice water was added into the reaction vessel to deactivate the concentrated nitric acid. Subsequently, 300 mL of chloroform was added into the reaction vessel to separate the vessel contents into a water layer and an organic layer. The water layer was discarded then to collect the organic layer. The collected organic layer was then washed with 300 mL of tap water. Next, the organic layer washed with tap water was washed with 300 mL of saturated sodium bicarbonate water. The organic layer washed with the saturated sodium bicarbonate water was then washed with 300 mL of saturated saline water. Subsequently, anhydrous sodium sulfate was added to the organic layer washed with the saturated saline water and stirring was performed for approximately 30 minutes (dewatering treatment). The organic layer thus dewatered was filtered to collect a filtrate. The collected filtrate was condensed using an evaporator to yield 7.6 g of a crude product of the intermediate (B). In the synthesis of the specific photobase generator (I), the intermediate (B) was a compound represented by chemical formula (b-1) shown below (also referred to below as an intermediate (b-1)).

Subsequently, the crude product of the intermediate (B) was subjected to column chromatography. In the column chromatography, 203 g of silica gel was used as a carrier and a solvent mixture of hexane and ethyl acetate (mass of hexane:mass of ethyl acetate=1:1) was used as a solvent. Through the column chromatography, a spot including the intermediate (B) were isolated. Thereafter, 7.5 g of purified intermediate (B) was obtained from the isolated spot.

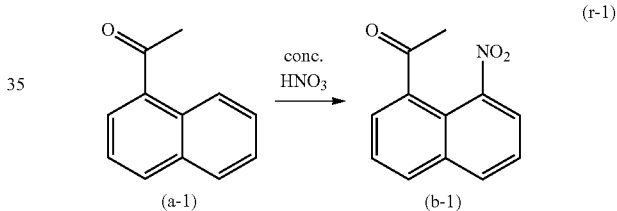

(Second Reaction)

A four-necked flask with a thermometer and a stir bar set thereto was used as a reaction vessel. The reaction vessel was charged with 40 mL of tetrahydrofuran and 3.84 g of the purified intermediate (B) to dissolve the intermediate (B) in the tetrahydrofuran. Next, the reaction vessel was set in an ice bath for cooling to decrease the internal temperature of the reaction vessel to around 0° C. The reaction vessel was then charged gradually with 670 mg of sodium borohydride, and the vessel contents were stirred for one hour. The reaction vessel was then taken out from the ice bath to increase the internal temperature of the reaction vessel to room temperature (23° C.). Subsequently, the contents of the reaction vessel were stirred for approximately one hour. Thin layer chromatography was performed to confirm that the intermediate (B) had disappeared from the contents of the reaction vessel. In the thin layer chromatography, a solvent mixture of ethyl acetate and n-hexane (mass of ethyl acetate:mass of n-hexane=1:3) was used as a developing solvent. Next, the contents of the reaction vessel were added to 70 mL of 1 mol/L hydrochloric acid (HCl) aqueous solution to yield a solution A. Through the above processes, non-reacted sodium borohydride contained in the contents of the reaction vessel was completely reacted. Subsequently, the solution A was condensed using an evaporator to give a residue. Next, 130 mL of dichloromethane was added to the residue to completely dissolve the residue in the dichloromethane. Through the above processes, a solution B was yielded. The solution B was then washed with 130 mL of tap water. Next, the solution B washed with tap water was washed with 130 mL of saturated sodium bicarbonate water. Subsequently, the solution B washed with the saturated sodium bicarbonate water was washed with 130 mL of saturated saline water. Anhydrous sodium sulfate was then added to the solution B washed with saturated saline water, and stirring was performed for 30 minutes (dewatering treatment). The solution B thus dewatered was filtered to collect a filtrate. The collected filtrate was condensed using an evaporator to yield 2.49 g of a crude product of the intermediate (C). In synthesis of the specific photobase generator (I), the intermediate (C) was a compound represented by chemical formula (c-1) shown below.

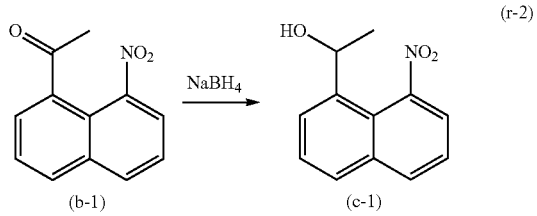 [SMILES: CC(=O)c1cccc2cccc([N+](=O)[O-])c12 ; "NaBH4" ; CC(O)c1cccc2cccc([N+](=O)[O-])c12]

(Third Reaction)

A four-necked flask with a thermometer and a stir bar set thereto was used as a reaction vessel. At room temperature (23° C.), the reaction vessel was charged with 20 mL of dichloromethane and the contents were stirred. Next, 2.17 g of the crude product of the intermediate (C) was added into the reaction vessel to dissolve the intermediate (C) in the dichloromethane. The reaction vessel was then charged with 1.4 mL of triethylamine, and the vessel contents were stirred for approximately five minutes. Then 1.98 g of 1,1'-carbonyldiimidazole (CDI) was added into the reaction vessel and the vessel contents were stirred for two hours. Thin layer chromatography was performed to confirm that the intermediate (C) had been consumed to yield the intermediate (D). In the thin layer chromatography, a solvent mixture of ethyl acetate and n-hexane (mass of ethyl acetate:mass of n-hexane=1:3) was used as a developing solvent. In the synthesis of the specific photobase generator (I), the intermediate (D) was a compound represented by chemical formula (d-1) shown below.

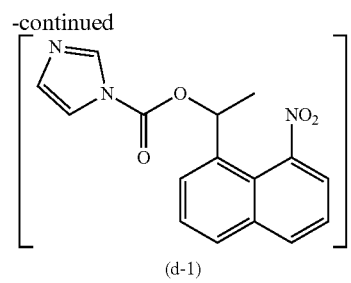

(Fourth Reaction)

Next, an organic amine compound was added into the reaction vessel and the vessel contents were stirred for approximately 12 hours. In the synthesis of the specific photobase generator (I), n-butylamine was used as the organic amine compound. Thin layer chromatography was then performed to confirm that the intermediate (D) had been consumed to produce the specific photobase generator (I). In the thin layer chromatography, a solvent mixture of ethyl acetate and n-hexane (mass of ethyl acetate:mass of n-hexane=1:3) was used as a developing solvent. The contents of the reaction vessel were then condensed using an evaporator to collect a residue. Subsequently, 50 mL of ethyl acetate was added to the collected residue to completely dissolve the residue in the ethyl acetate, thereby yielding a solution C (organic layer). The solution C was then washed with 50 mL of 1 N HCl aqueous solution. Next, the solution C washed with the HCl aqueous solution was washed with 50 mL of saturated sodium bicarbonate water. Subsequently, the solution C washed with the saturated sodium bicarbonate water was washed with 50 mL of saturated saline water. Anhydrous sodium sulfate was then added to the solution C washed with the saturated saline water, and stirring was performed for approximately 30 minutes (dewatering treatment). The solution C thus dewatered was filtered to collect a filtrate. The collected filtrate was condensed using an evaporator to yield a crude product of the specific photobase generator (I).

The resultant crude product of the specific photobase generator (I) was subjected to column chromatography. In the column chromatography, silica gel of which volume was 30 times the volume of the crude product was used as a carrier. Also in the column chromatography, a solvent mixture of hexane and ethyl acetate (mass of hexane:mass of ethyl acetate=1:1) was used as a solvent. Through the column chromatography, a spot including the specific photobase generator (I) were isolated. Thereafter, 2.2 g of purified specific photobase generator (I) was obtained from the isolated spot.

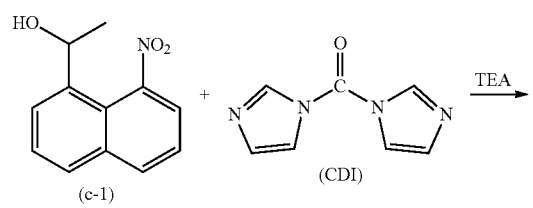

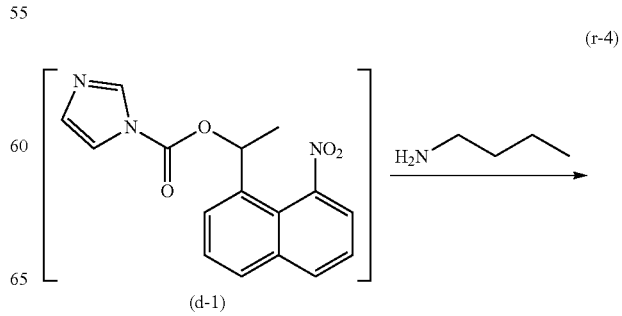

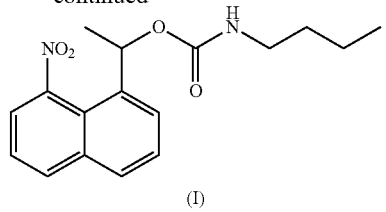

(I)

(Specific Photobase Generator (II))

The specific photobase generator (II) was synthesized according to the same method as for the specific photobase generator (I) in all aspects other than the following change. In the synthesis of the specific photobase generator (II), an equimolar amount of a compound represented by chemical formula (b-3) shown below (also referred to below as an intermediate (b-3)) was used as the intermediate (B) used in the first reaction in place of the intermediate (b1-1). The intermediate (b-3) was synthesized by a reaction represented by chemical equation (r-5) shown below. The following describes a synthesis method of the intermediate (b-3) in detail.

(Synthesis of Intermediate (b-3)).

The intermediate (b-1) was yielded according to the same method as that in synthesis of the specific photobase generator (I). Then, 10 g of the resultant intermediate (b-1) was dissolved in 100 mL of dry methanol to yield a reaction liquid. Hydrogen gas was blown into the reaction liquid for 30 minutes at 25° C. to convert a nitro group of the intermediate (b-1) to an amino group. Through the above processes, 8.5 g of a compound represented by chemical formula (b-2) shown below (also referred to below as an intermediate (b-2)) was yielded.

Next, 8 g of the intermediate (b-2) was dissolved in 100 mL of 1 mol/L sulfuric acid to yield a reaction liquid. Then, 22 mL of an aqueous solution of sodium nitrite (1 mmol/L) was dripped into the reaction liquid while the liquid temperature of the reaction liquid was kept at 0° C. to 5° C. After the dripping, the resultant reaction liquid was stirred for 30 minutes while the liquid temperature of the reaction liquid was kept at 0° C. to 5° C. Next, 0.2 g of copper cyanide (CuCN) was added into the reaction liquid while the liquid temperature of the reaction liquid was kept at 0° C. to 5° C. Thereafter, the reaction liquid was caused to react at 0° C. to 5° C. for two hours. After completion of the reaction, the reaction liquid was poured into 100 mL of ice water. Then, 50 mL of diethyl ether was added to the reaction liquid and an ether layer was extracted. The extracted ether layer was condensed using an evaporator to yield 6.5 g of a crude product of the intermediate (b-3).

Subsequently, 6.5 g of the crude product of the intermediate (b-3) was subjected to column chromatography. In the column chromatography, 650 g of silica gel was used as a carrier and a solvent mixture of hexane and ethyl acetate (mass of hexane:mass of ethyl acetate=4:1) was used as a solvent. Through the column chromatography, a spot including the intermediate (b-3) were isolated. Thereafter, 5.8 g of purified intermediate (b-3) was obtained from the isolated spot.

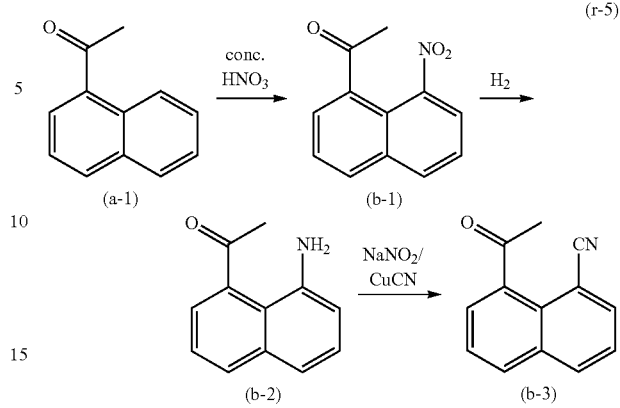

(Synthesis of Specific Photobase Generator (III))

The specific photobase generator (III) was synthesized according to the same synthesis method as for the specific photobase generator (I) in all aspects other than the following change. In the synthesis of the specific photobase generator (III), an equimolar amount of isobutylamine was used as the organic amine compound used in the fourth reaction in place of n-butylamine.

(Synthesis of Specific Photobase Generator (IV))

The specific photobase generator (IV) was synthesized according to the same synthesis method as for the specific photobase generator (II) in all aspects other than the following change. In the synthesis of the specific photobase generator (IV), an equimolar amount of isobutylamine was used as the organic amine compound used in the fourth reaction in place of n-butylamine.

[Preparation of Pretreatment Liquid (A-1)]

To ion exchanged water, 0.5 g of the specific photobase generator (I), 0.1 g of "OLFINE (registered Japanese trademark) E1010" (product of Nissin Chemical Industry Co., Ltd.) as a surfactant, and 10.0 g of glycerin and 5.0 g of 2-pyrrolidone each as a water-soluble organic solvent were added to adjust the total amount thereof to 100.0 g. Thus, a pretreatment liquid (A-1) was produced.

[Preparation of Pretreatment Liquids (A-2) to (A-4) and (B-2)]

Pretreatment liquids (A-2) to (A-4) and (B-2) were prepared according to the same preparation method as for the pretreatment liquid (A-1) in all aspects other than that the type of the specific photobase generator was changed to those shown in Table 1 below. Note that "00396" in Table 1 represents "00396" produced by Tokyo Chemical Industry Co., Ltd. "00396" produced by Tokyo Chemical Industry Co., Ltd. contained a compound that produces a cyclic guanidine compound through light exposure and that is represented by chemical formula shown below.

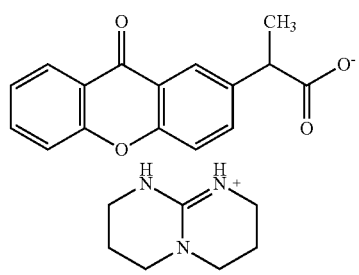

[Preparation of Pretreatment Liquid (B-1)]

To ion exchanged water, 0.5 g of n-butylamine, 5.0 g of 2-pyrrolidone as a water-soluble organic solvent, and 0.1 g of "OLFINE (registered Japanese trademark) E1010" produced by Nissin Chemical Industry Co., Ltd. were added to adjust the total amount thereof to 100.0 g. Thus, a pretreatment liquid (B-1) was produced.

TABLE 1

| Pretreatment liquid | Specific photobase generator | Organic amine compound |
|---|---|---|
| A-1 | I | — |
| A-2 | II | — |
| A-3 | III | — |
| A-4 | IV | — |
| B-1 | — | N-butylamine |
| B-2 | O0396 | — |

[Preparation of Black Ink]

A liquid mixture was yielded by mixing 2 parts by mass of poly-N,N'-dimethyl-3,5-methylene piperidinium salt (product of SENKA Corporation, Mw: 3700), which is a cationic resin, 5 parts by mass of diethylene glycol, and 78 parts by mass of ion exchanged water together. The resultant liquid mixture was heated to 70° C. using a water bath. Through the heating, the cationic resin was completely dissolved in a solvent (diethylene glycol and ion exchanged water). Next, 15 parts by mass of carbon black ("#7550B/F", product of TOKAI CARBON CO., LTD.) as a pigment was added to the liquid mixture. Premixing was then performed on the liquid mixture for 30 minutes. Dispersion treatment was then performed on the premixed liquid mixture under the following conditions.

(Dispersion Conditions)
Disperser: sand grinder (product of Aimex Co. Ltd.)
Pulverization medium: zirconia beads (1 mm diameter)
Pulverization media filling rate: 60% by volume
Pulverization time: six hours Centrifugation (at 10,000 rpm for 2 minutes) was performed on the liquid mixture subjected to the dispersion treatment to deposit coarse particles, and a supernatant was collected. The collected supernatant was used as a black pigment dispersion. The black pigment dispersion contained at a concentration of 12.5% by mass the carbon black having a volume median diameter ($D_{50}$) of 130 nm.

Then, 80 parts by mass of the black pigment dispersion, 15 parts by mass of 1,3-propanediol, 5 parts by mass of 2-pyrrolidone, 0.2 parts by mass of "SURFYNOL (registered Japanese trademark) 104" produced by Nissin Chemical Industry Co., Ltd. as a surfactant were mixed together. The resultant mixture was filtered using a membrane filter having a pore size of 0.5 μm to thus produce a black ink (pigment concentration: 10% by mass).

[Preparation of Yellow Ink]

A yellow pigment dispersion was prepared according to the same preparation method as for the black pigment dispersion in all aspects other than the type of the pigment was changed to a yellow pigment ("FAST YELLOW 7413", product of SANYO COLOR WORKS, Ltd.). The yellow pigment dispersion contained at a concentration of 12.5% by mass the yellow pigment having a volume median diameter ($D_{50}$) of 130 nm.

Then, 40 parts by mass of the yellow pigment dispersion, 20 parts by mass of 1,3-propanediol, 5 parts by mass of 2-pyrrolidone, 0.2 parts by mass of "SURFYNOL (registered Japanese trademark) 104" produced by Nissin Chemical Industry Co., Ltd. as a surfactant, and 35 parts by mass of ion exchanged water were mixed together. The resultant mixture was filtered using a membrane filter having a pore size of 0.5 μm to produce a yellow ink (pigment concentration: 5% by mass).

<Evaluation>

Preservability, odor production, ink nozzle clogging, and quality of a formed image were evaluated for the pretreatment liquids (A-1) to (A-4), (B-1), and (B-2) (Examples 1 to 4 and Comparative Examples 2 and 3). Furthermore, image formation was performed without using any pretreatment liquid and odor production, ink nozzle clogging, and quality of a formed image were evaluated (Comparative Example 1). Each evaluation was carried out under environmental conditions of a temperature of 20° C. and a relative humidity of 30%. Evaluation results are shown in Table 2 below.

(Evaluation Apparatus)

An evaluation apparatus used for image formation was a modified version of an inkjet recording apparatus (prototype produced by KYOCERA Document Solutions Inc.) including a conveyance unit (belt conveyor) and four recording heads (each are a line type recording head). The recording heads of the prototype each were a piezoelectric head having a resolution of 600 dpi (=150 dpi by 4 lines), 2,400 nozzles (=600 by 4 lines), a droplet amount of 11 pL, and a drive frequency of 20 kHz. The four recording heads of the prototype were arranged so that each longitudinal direction thereof was perpendicular to a conveyance direction of paper. The four recording heads were arranged at intervals of 50 mm. In modification, a light exposure section (KrCl excimer light irradiation unit, product of USHIO INC.) was provided on the upstream side of the four recording heads in terms of the conveyance direction and a pretreatment section was provided on the further upstream side of the light exposure section in terms of the conveyance direction. Conditions for light exposure included a wavelength of 222 nm and a light intensity of 10 mW/cm$^2$. The pretreatment section was set to eject a pretreatment liquid using piezoelectric heads of which type is the same as that of the above-described recording heads. An ejection amount of the pretreatment liquid was set to 3.0 nL per mm$^2$ of an image formation area of a recording medium.

Of the four recording heads, respective two recording heads were set to eject the black ink and the yellow ink prepared as above. Note that the other two recording heads were not used.

[Ink Nozzle Clogging]

Continuous printing on 10,000 sheets of A4-size recording paper was performed at a printing rate of 100% using the above-described evaluation apparatus. Thereafter, the number of nozzles of the evaluation apparatus having failed in ejection was counted. Ink nozzle clogging was evaluated based on the following criteria.

A (Good): the number of nozzles having failed in ejection was no greater than 5

B (Poor): the number of nozzles having failed in ejection was greater than 5

[Odor Production]

Whether or not an odor was produced from the evaluation apparatus during the continuous printing was checked in the above evaluation of ink nozzle clogging through a sensory test. The sensory test was carried out at a location within 1 m from the evaluation apparatus. As to an odor of each pretreatment liquid, the pretreatment liquid was rated as good (A) if no odor was recognized in the sensory test and evaluated as poor (B) if an odor was recognized in the sensory test.

[Preservability]

After a pH of 100 g of each pretreatment liquid was measured, the pretreatment liquid was stored at 60° C. for one month. Then, a pH thereof was measured again. A pH change was calculated using the following equation. Preservability was evaluated based on the following criteria.

pH change=(pH before storage)−(pH after storage)

A (Good): absolute value of pH change was no greater than 0.3

B (Poor): absolute value of pH change was greater than 0.3

[Image Evaluation]

An image was formed on each of the following recording media using the above-described evaluation apparatus, and image density, feathering, and color bleed were evaluated.

(Recording Media)

The following were prepared as recording media used for evaluation.

Coated paper A: "POD GROSS COAT (business coat gross)" produced by Oji Paper Co., Ltd., grammage 100 g/m$^2$ Gravure printing paper: "SPACE DX" produced by Oji Paper Co., Ltd., grammage 56.5 g/m$^2$ Coated paper B: "SUPER FINE PAPR (matte coated paper for inkjet printing)" produced by SEIKO EPSON CORPORATION, grammage 102 g/m$^2$ Transparent polyester film (PEs film): "LUMIRROR (registered Japanese trademark) U10" produced by Toray Industries, Inc., thickness 100 μm Polyester cloth (PEs cloth): "POLYESTER TAFFETA" produced by SHIKISENSHA CO., LTD., fiber grammage 71.8 g/m$^2$ (Image Density)

A black solid image with a size of 2 cm by 2 cm was formed on each recording medium using the evaluation apparatus. Pretreatment liquids used in the evaluation apparatus were the pretreatment liquids (A-1) to (A-4), (B-1), and (B-2) after 1-month storage at 60° C. and the pretreatment liquids (A-1) to (A-4), (B-1), and (B-2) before the storage. The resolution of the black solid image was set to 600 dpi. An image density of each formed black solid image was measured using a "reflective color spectrophotometer" produced by X-Rite Inc. A larger measurement value of image density indicates that an image has a higher image density.

Each pretreatment liquid was evaluated as Good (A) if the image density of an image formed using the pretreatment liquid before the storage had satisfied the following criteria and evaluated as Poor (B) if the image density thereof had not satisfied the following criteria.

(Evaluation Criteria of Image Density)

Coated paper A: at least 1.4

Gravure printing paper: at least 1.4

Coated paper B: at least 1.4

PEs film: at least 1.8

PEs cloth: at least 1.8

(Feathering)

A black fine line having a width of 1 mm was formed on each recording medium using the evaluation apparatus, and observed with the naked eye. Pretreatment liquids used herein were the pretreatment liquids (A-1) to (A-4), (B-1), and (B-2) after 1-month storage at 60° C. and the pretreatment liquids (A-1) to (A-4), (B-1), and (B-2) before the storage. The resolution of the black fine line was set to 600 dpi. In evaluation of feathering, each pretreatment liquid was rated as Good (A) in a case where no blurring (feathering) had occurred around both the black fine line formed using the pretreatment liquid before the storage and the black fine line formed using the pretreatment liquid after the storage, and evaluated as Poor (B) in the other cases.

(Color Bleed)

A black solid image with a size of 4 cm by 4 cm and a yellow solid image with a size of 4 cm by 4 cm were formed so as to be adjacent to each other on each recording medium using the evaluation apparatus. A boundary portion between the black solid image and the yellow solid image was then observed with the naked eye. Pretreatment liquids used herein were the pretreatment liquids (A-1) to (A-4), (B-1), and (B-2) after 1-month storage at 60° C. and the pretreatment liquids (A-1) to (A-4), (B-1), and (B-2) before the storage. Each resolution of the black solid image and the yellow solid image was set to 600 dpi. In evaluation of color bleed, each pretreatment liquid was rated as Good (A) in a case where no color mixing was recognized in both the boundary portion between the black solid image and the yellow solid image formed using the pretreatment liquid before the storage and the boundary portion therebetween formed using the pretreatment liquid after the storage, and evaluated as Poor (B) in the other cases.

Note that "-" in Table 2 indicates that no corresponding evaluation was performed.

TABLE 2

| | Pretreatment liquid | Recording medium | Image density Before storage/ After storage | Evaluation | Feathering | Color bleed | Ink nozzle clogging | Odor | Preservability |
|---|---|---|---|---|---|---|---|---|---|
| Example 1 | A-1 | Coated paper A | 1.5/1.5 | A | A | A | A | A | A |
| | | Gravure printing paper | 1.7/1.7 | A | A | A | | | |
| | | Coated paper B | 1.7/1.7 | A | A | A | | | |
| | | PEs film | 2.2/2.2 | A | A | A | | | |
| | | PEs cloth | 2.5/2.5 | A | A | A | | | |
| Example 2 | A-2 | Coated paper A | 1.5/1.4 | A | A | A | A | A | A |
| | | Gravure printing paper | 1.7/1.6 | A | A | A | | | |
| | | Coated paper B | 1.6/1.6 | A | A | A | | | |
| | | PEs film | 2.1/2.0 | A | A | A | | | |
| | | PEs cloth | 2.3/2.2 | A | A | A | | | |
| Example 3 | A-3 | Coated paper A | 1.4/1.4 | A | A | A | A | A | A |
| | | Gravure printing paper | 1.6/1.6 | A | A | A | | | |
| | | Coated paper B | 1.5/1.5 | A | A | A | | | |
| | | PEs film | 2.0/1.9 | A | A | A | | | |
| | | PEs cloth | 2.2/2.2 | A | A | A | | | |

TABLE 2-continued

|  | Pretreatment liquid | Recording medium | Image density Before storage/ After storage | Evaluation | Feathering | Color bleed | Ink nozzle clogging | Odor | Preservability |
|---|---|---|---|---|---|---|---|---|---|
| Example 4 | A-4 | Coated paper A | 1.4/1.4 | A | A | A | A | A | A |
|  |  | Gravure printing paper | 1.6/1.6 | A | A | A |  |  |  |
|  |  | Coated paper B | 1.6/1.6 | A | A | A |  |  |  |
|  |  | PEs film | 2.0/2.0 | A | A | A |  |  |  |
|  |  | PEs cloth | 2.2/2.2 | A | A | A |  |  |  |
| Comparative Example 1 | — | Coated paper A | 1.3/– | B | B | B | A | A | — |
|  |  | Gravure printing paper | 1.3/– | B | B | B |  |  |  |
|  |  | Coated paper B | 1.2/– | B | B | B |  |  |  |
|  |  | PEs film | 1.7/– | B | B | B |  |  |  |
|  |  | PEs cloth | 1.7/– | B | B | B |  |  |  |
| Comparative Example 2 | B-1 | Coated paper A | 1.5/1.5 | A | A | A | B | B | B |
|  |  | Gravure printing paper | 1.4/1.4 | A | A | A |  |  |  |
|  |  | Coated paper B | 1.6/1.6 | A | A | A |  |  |  |
|  |  | PEs film | 2.0/2.0 | A | A | A |  |  |  |
|  |  | PEs cloth | 2.2/2.1 | A | A | A |  |  |  |
| Comparative Example 3 | B-2 | Coated paper A | 1.4/1.1 | A | A | A | B | B | B |
|  |  | Gravure printing paper | 1.7/1.2 | A | A | A |  |  |  |
|  |  | Coated paper B | 1.6/1.3 | A | A | A |  |  |  |
|  |  | PEs film | 2.1/1.6 | A | A | A |  |  |  |
|  |  | PEs cloth | 2.3/1.8 | A | A | A |  |  |  |

The pretreatment liquids (A-1) to (A-4) respectively used in Examples 1 to 4 each contained a specific photobase generator that produces an organic amine compound through light exposure. As a result, high-quality image formation was achieved while occurrence of ink nozzle clogging was inhibited in Examples 1 to 4 as shown in Table 2. Furthermore, odder production was inhibited in Examples 1 to 4. Moreover, the pretreatment liquids (A-1) to (A-4) had excellent preservability.

By contrast, Comparative Example 1 used no pretreatment liquid. As a result, sufficiently high quality image formation was not achieved in Comparative Example 1 as shown in Table 2.

The pretreatment liquid (B-1) used in Comparative Example 2 contained an organic amine compound in place of a specific photobase generator. As a result, ink nozzle clogging occurred although high-quality image formation was achieved in Comparative Example 2 as shown in Table 2. It is determined that such clogging was caused because a mist mixture including agglomerate was generated through mixing of a mist containing the organic amine compound and a mist containing an ink in the inkjet recording apparatus. Furthermore, the pretreatment liquid (B-1) had poor preservability. Moreover, an odor was produced due to generation of a mist containing the organic amine compound.

The pretreatment liquid (B-2) used in Comparative Example 3 contained, in place of a specific photobase generator, a photobase generator that produces a cyclic guanidine compound through light exposure. As a result, ink nozzle clogging occurred although high-quality image formation was achieved in Comparative Example 3 as shown in Table 2. The reason for the clogging was determined as follows. The pretreatment liquid (B-2) had poor preservability, and a cyclic guanidine compound was produced even before the light exposure. Furthermore, a mist mixture including agglomerate was generated through mixing of a mist containing the cyclic guanidine compound and a mist containing an ink in the inkjet recording apparatus in Comparative. Moreover, an odor was produced due to generation of a mist containing the cyclic guanidine compound in Comparative Example 3.

From the above, it can be determined that the pretreatment liquid, the inkjet recording apparatus, and the image formation method according to the present disclosure can inhibit occurrence of ink nozzle clogging and improve quality of formed images.

What is claimed is:

1. An inkjet recording apparatus that forms an image on an image formation area of a recording medium, comprising:

a pretreatment section configured to eject a pretreatment liquid for inkjet recording toward the image formation area of the recording medium;

a light exposure section configured to perform light exposure on the image formation area of the recording medium to which the pretreatment liquid for inkjet recording has been ejected; and a recording head configured to form the image by ejecting an ink toward the image formation area of the recording medium subjected to the light exposure, wherein the pretreatment liquid for inkjet recording contains a photobase generator that produces an organic amine compound through light exposure, the ink is a water-based ink containing an aqueous medium and pigment particles containing a pigment and a cationic resin, and the cationic resin includes a repeating unit having a piperidinium structure.

2. The inkjet recording apparatus according to claim 1, wherein the photobase generator includes a compound represented by general formula (1) shown below:

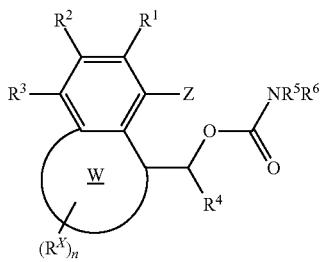

(1)

where in the general formula (1),

Z represents a monovalent electron-withdrawing group,

W represents a saturated alicyclic hydrocarbon ring, an unsaturated alicyclic hydrocarbon ring, or an aromatic hydrocarbon ring, $R^1$ to $R^3$ each represent, independently of one another, a hydrogen atom, a monovalent hydrocarbon group having a carbon number of at least 1 and no greater than 5, or a hydrocarbon-oxy group having a carbon number of at least 1 and no greater than 5, $R^X$ represents a monovalent hydrocarbon group having a carbon number of at least 1 and no greater than 5 or a hydrocarbon-oxy group having a carbon number of at least 1 and no greater than 5, n represents an integer of at least 0 and no greater than 5, where n represents an integer of at least 2 and no greater than 5, chemical groups $R^X$ may be the same as or different from one another, any of pairs of $R^1$ and $R^2$, $R^2$ and $R^3$, $R^3$ and one of the chemical groups $R^X$, and adjacent two of the chemical group $R^X$ may be bonded to each other to form a ring, $R^4$ represents a hydrogen atom, a monovalent hydrocarbon group having a carbon number of at least 1 and no greater than 6, or a monovalent aromatic hydrocarbon group having a carbon number of at least 6 and no greater than 15, $R^5$ represents a monovalent hydrocarbon group having a carbon number of at least 1 and no greater than 15, $R^6$ represents a hydrogen atom or a monovalent hydrocarbon group having a carbon number of at least 1 and no greater than 15, and $R^5$ and $R^6$ may be bonded to each other to form a ring.

3. The inkjet recording apparatus according to claim 2, wherein the compound represented by the general formula (1) includes a compound represented by general formula (1-1) shown below:

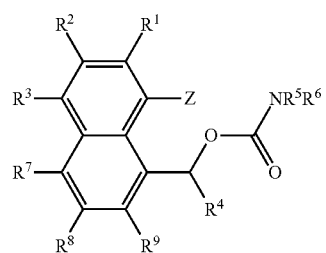

(1-1)

where in the general formula (1-1),

Z and $R^4$ to $R^6$ are the same as those defined in the general formula (1), $R^1$ to $R^3$ and $R^7$ to $R^9$ each represent, independently of one another, a hydrogen atom, a monovalent hydrocarbon group having a carbon number of at least 1 and no greater than 5, or a hydrocarbon-oxy group having a carbon number of at least 1 and no greater than 5, and any of pairs of $R^1$ and $R^2$, $R^2$ and $R^3$, $R^3$ and $R^7$, $R^7$ and $R^8$, and $R^8$ and $R^9$ may be bonded to each other to form a ring.

4. The inkjet recording apparatus according to claim 3, wherein the compound represented by the general formula (1-1) includes at least one of compounds represented by chemical formula (I) to (IV) shown below:

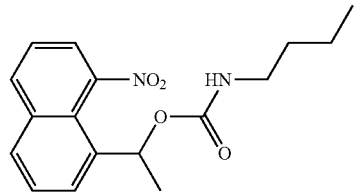

(I)

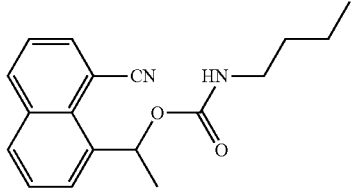

(II)

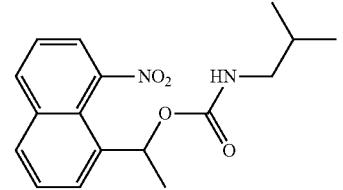

(III)

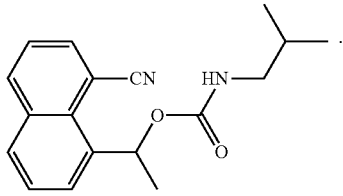

(IV)

5. The inkjet recording apparatus according to claim 1, wherein a content by percentage of the photobase generator in the pretreatment liquid is at least 0.1% by mass and no greater than 5.0% by mass.

6. An image formation method for forming an image on an image formation area of a recording medium, the method comprising:

ejecting a pretreatment liquid for inkjet recording toward the image formation area of the recording medium;

performing light exposure on the image formation area of the recording medium to which the pretreatment liquid for inkjet recording has been ejected; and ejecting an ink toward the image formation area of the recording medium subjected to the light exposure to form the image, wherein the pretreatment liquid for inkjet recording contains a photobase generator that produces an organic amine compound through light exposure, the ink is a water-based ink containing an aqueous medium and pigment particles containing a pigment and a cationic resin, and the cationic resin includes a repeating unit having a piperidinium structure.

* * * * *